(12) United States Patent
Mattos et al.

(10) Patent No.: US 8,762,867 B1
(45) Date of Patent: Jun. 24, 2014

(54) PRESENTATION OF MULTI-CATEGORY GRAPHICAL REPORTS

(75) Inventors: Camilo Mattos, Los Angeles, CA (US); Santiago Becerra, Del Mar, CA (US); Quinton Alsbury, Venice, CA (US)

(73) Assignee: MeLLmo Inc., Solano Beach, CA (US)

( * ) Notice: Subject to any disclaimer, the term of this patent is extended or adjusted under 35 U.S.C. 154(b) by 134 days.

(21) Appl. No.: 13/473,072

(22) Filed: May 16, 2012

Related U.S. Application Data

(60) Provisional application No. 61/486,754, filed on May 16, 2011.

(51) Int. Cl.
- G06F 3/048 (2013.01)
- G06F 3/0481 (2013.01)
- G06F 3/0484 (2013.01)
- G09G 5/22 (2006.01)

(52) U.S. Cl.
CPC ............. *G06F 3/048* (2013.01); *G06F 3/0481* (2013.01); *G06F 3/0484* (2013.01)
USPC ...................................... 715/764; 345/440.2

(58) Field of Classification Search
CPC ...... G06F 3/048; G06F 3/0481; G06F 3/0484
USPC ........................................ 715/764; 345/440.2
See application file for complete search history.

(56) References Cited

U.S. PATENT DOCUMENTS

| | | | | |
|---|---|---|---|---|
| 6,963,826 | B2 * | 11/2005 | Hanaman et al. | 703/2 |
| 7,800,613 | B2 * | 9/2010 | Hanrahan et al. | 345/440 |
| 2009/0006156 | A1 * | 1/2009 | Hunt et al. | 705/7 |
| 2012/0079431 | A1 * | 3/2012 | Toso | 715/836 |

* cited by examiner

Primary Examiner — William Bashore
Assistant Examiner — James F Sugent
(74) Attorney, Agent, or Firm — Fenwick & West LLP

(57) ABSTRACT

Described embodiments enable display of graphical reports based on multi-category data. A graphical report is generated and displayed on the device. The graphical report includes data corresponding to selected values from multiple categories. All values for some categories are displayed near the chart, for example, using a textual representation. A graphical representation of the relative magnitude of each value in some categories is also displayed near the chart. When appropriate user input is received, the categories displayed as magnitudes are displayed textually, and categories displayed textually are displayed as magnitudes. When appropriate user input is received, the categories for which values are displayed are changed.

20 Claims, 4 Drawing Sheets

PRESENTATION OF MULTI-CATEGORY GRAPHICAL REPORTS

CROSS-REFERENCE TO RELATED APPLICATION

This application claims the benefit of U.S. Provisional Application No. 61/486,754, entitled "PRESENTATION OF MULTI-CATEGORY GRAPHICAL REPORTS," filed May 16, 2011, which is incorporated herein by reference in its entirety.

BACKGROUND

1. Field of the Invention

This disclosure relates generally to displaying and navigating between reports of multi-category data on a device having a display area that is small relative to the amount of data that is being displayed.

2. Description of Related Art

Frequently there is desire to display on a display screen of a computing device data having multiple dimensions, for example, multi-dimensional charts or graphs. On a mobile device such as a handheld computer, cell phone, tablet computer, netbook, or personal digital assistant (PDA), such graphs and charts have to be displayed on small display screens. Because of the limited display area, only information related to either a single data point or a small subset of data points can be displayed at a time. Users inspect various portions of the charts, for example by using a scroll bar or by viewing the data a page at a time. Users navigate through the data using a pointing device or keys to move through the data set.

SUMMARY

Business data can be assembled into a plurality of reports. For example, a sales report may include sales data about a plurality of products sold at a plurality of stores, in a plurality of cities, in a plurality of regions, in a plurality of countries. It is typical to filter data and create sub-reports to drill down on the overall data and gain insight into specific aspects of the global report. The report data is typically stored in a memory, and sub-reports are either stored in memory as well or generated on the fly as needed. Reports can be displayed either textually or graphically—for example, by building a bar chart, line chart, or pie chart based on the report or sub-report. In the above example, perhaps a VP of International Sales might be interested in knowing how sales of a particular product in Louisiana have fared over the preceding twelve months.

Described embodiments enable effective display of and navigation between graphical reports based on multi-category data. In various embodiments, the display device has a display area that is small compared to the amount of data being shown. Examples of such devices include tablet computers, smart phone devices, and mobile phones. Some embodiments of the invention enable effective display of multi-category data on devices with larger display areas, for example, desktop computers. In various embodiments, navigation between displayed reports is facilitated by use of touch input, e.g., finger swipes directly on the display device.

A graphical report such as a bar chart or line chart is generated and displayed on the device. The graphical report includes data corresponding to selected values from multiple categories. In addition to the data, x- and y-axis labels may also be displayed. All values for some categories are displayed near the chart, e.g., one set of values for a first category on the left side of the chart, and another set of values for a second category on the right side of the chart. A graphical representation of the relative magnitude of each value in a third and fourth category is displayed above and below the chart, respectively. When appropriate user input is received, the categories for which values are displayed are changed. For example, in one embodiment a set of values for a first category are displayed to the left of the chart and a set of values for a second category are displayed to the right of the chart. Magnitude indicators for values from the third and fourth categories are displayed above and below the chart. When user input is received, the display is updated so that the category values from the third and fourth categories are displayed to the left and right of the chart, and magnitude indicators for values of the first and second categories are displayed above and below the chart. In one embodiment, the user input is a swiping motion of a finger on the display device. In another embodiment, a multi-touch rotation gesture is received as the user input. Alternatively, the input includes use of a pointing/selecting device in a particular direction or by tilting of the device. In one embodiment, animation is used to illustrate the alternating category displays.

DETAILED DESCRIPTION

Figure 1:
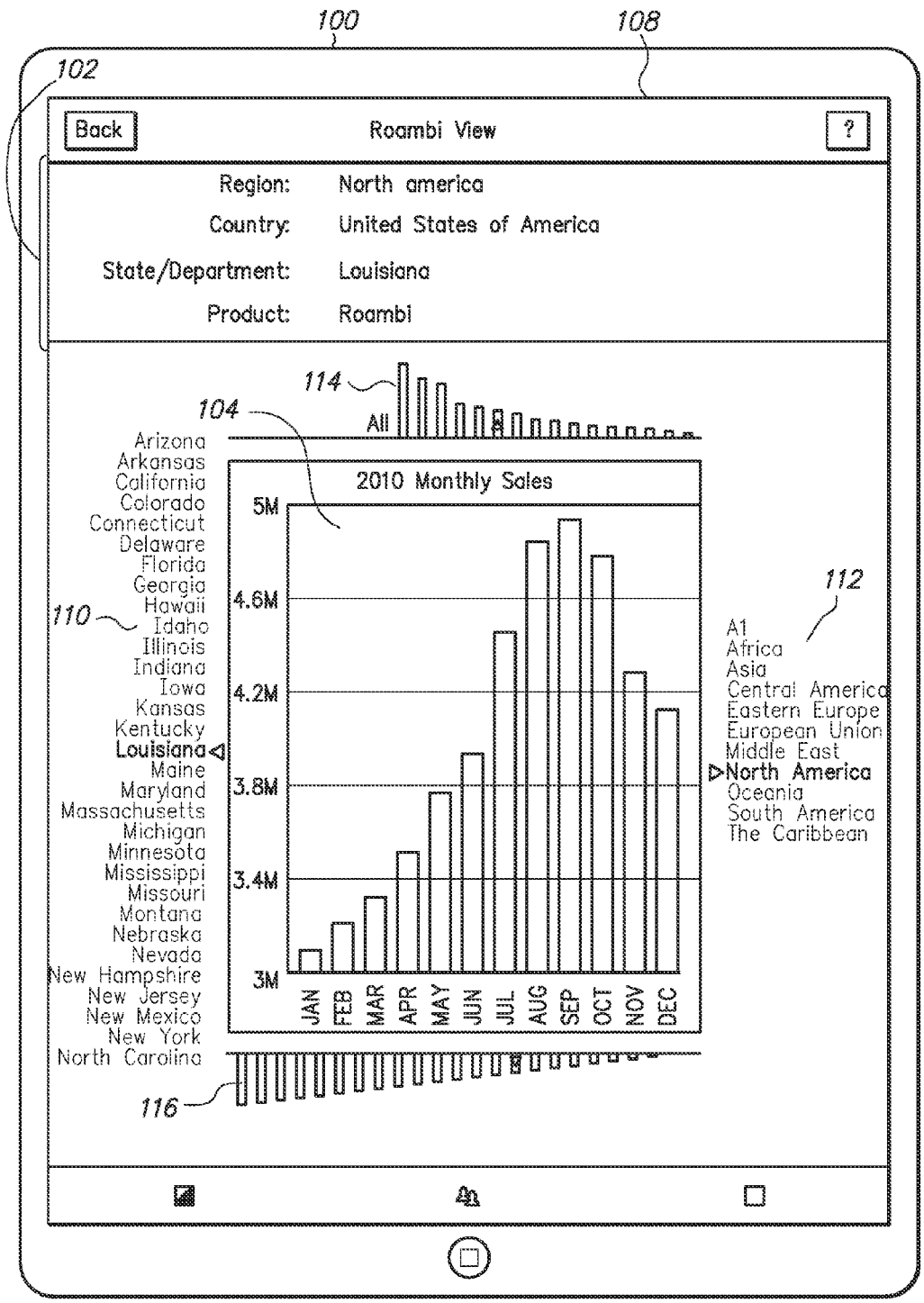
FIG. 1 illustrates a first view of a multi-category chart in accordance with one embodiment.

FIG. 1 illustrates a first chart 104 (an example of a graphical report) displayed on a display 108 of a device 100 in accordance with one embodiment. Device 100 may be a tablet computer, smart phone device, mobile phones, PDA or other mobile device. Device 100 may also be a laptop or personal computer. One example of a tablet computer is an iPad, by Apple Inc. of Cupertino, Calif. One example of a smart phone is an iPhone, also by Apple Inc. Device 100 runs an operating system such as the iOS operating system by Apple Inc. Other operating systems such as the Android operating system by Google Inc. of Mountain View, Calif., and others are also suitable. Display 108 in one embodiment is a touch-sensitive display, adapted to receive input from one or more fingers. In other embodiments, display 108 receives input from a pen-type or other input device.

Figure 2:
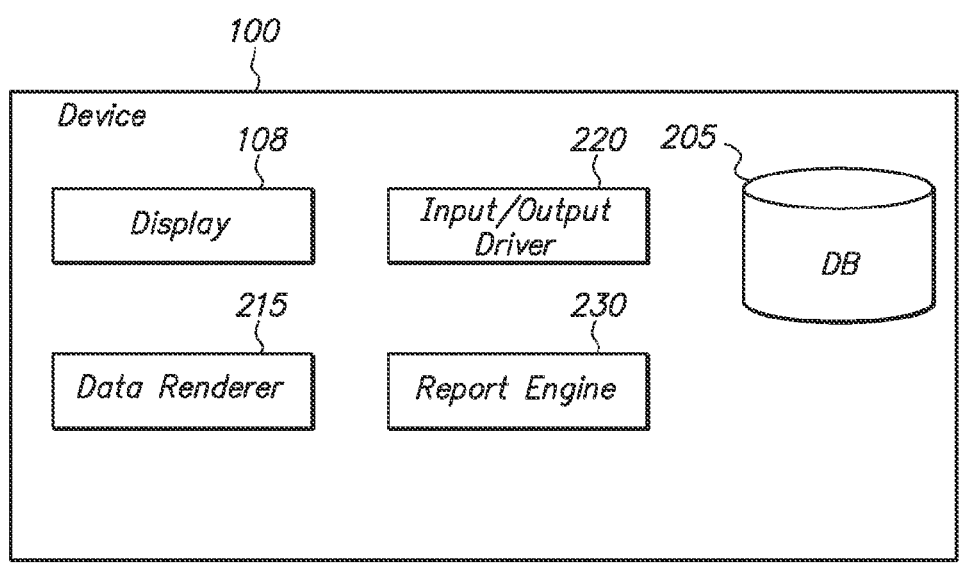
FIG. 2 is a block diagram of a device in accordance with one embodiment.

FIG. 2 illustrates components of a device 100 in one embodiment. Device 100 includes a database (DB) 205, a data renderer module 215, an input/output driver module 220 (also referred to as an IO driver module), display 108, and a report engine 230. Modules and engines include computer program logic and/or data for providing the specified functionality. A module can be implemented in hardware, firmware, and/or software. Note that many of the components of device 100 required for its operation but that are not germane to this description are not included in the figure solely for purposes of clarity.

The database 205 stores data and metadata associated with reports. Reports may be created in any conventional report format, for example a Microsoft Excel file, .csv file, XML, etc. The DB 205 in one embodiment is implemented using a hard disk drive but can also be implemented using any other device capable of storing data, such as a writeable compact disc (CD) or DVD, or a solid state memory device, for example a flash memory. Data for reports and sub-reports may be generated using software of device 100 or may be supplied from an external source. Report engine 230 determines which report should be displayed based on user input as described further below, and provides the appropriate report to data renderer module 215. Data renderer module 215 assembles information required for output to display 108. For example, the data renderer can determine the dimensions of bars in a bar chart if the data will be displayed as a bar chart. The data and the information for rendering the data are provided by the data renderer 215 to the input/output driver 220. The input/output driver 220 provides the display 108 with instructions and data necessary for displaying data and/or images. In various embodiments, the display 108 is used to receive user input data and/or commands. For example, a touch sensitive screen can sense the coordinates of the portion of the screen touched by a user. The user may touch the display 108, for example, to select a command from a list of commands or to select a data element from a list of data elements displayed on the screen. In various embodiments, the display 108 can be tilted by the user, for example by tilting the entire device 100 or, in alternative configurations, just display 108. The magnitude and direction of tilt of the display 108 is detected and can be treated as an input. The angle of the tilt of the display 108 is provided to the input/output driver 220 by hardware components such as an accelerometer. In some embodiments, a pointing device, such as a thumbwheel, mouse, track ball, or other type of pointing device is used to input data or commands into the system. The input/output driver 220 sends the data or instructions provided by the display 108 to report engine 230, which interprets the data and determines a next report to be displayed.

In various embodiments, a user may want to associate a particular report with a display mode, such as a pie chart, bar chart, or text mode. To allow the user to create an association between the report and a display mode, report engine 230 enables the user to select from a list of display modes. The user may make a selection by touching the appropriate portion of the display 108 showing a specific mode of display, or by providing input through another mechanism such as a keyboard or pointing device. Report engine 230 updates the report parameters of the appropriate report in the DB 205 to store the information related to mode of display of the report. The information associating the report with a mode of display is used subsequently to display the report.

In another scenario, the user may be presented with a list of reports that can be reviewed. The user selects a particular report name and report engine 230 reads the report data and generates or retrieves the graphical report, which is then displayed on display 108 in the specified format. Various other scenarios of interactions between the user and the various components and modules displayed in FIG. 2 are possible. Note also that the components illustrated in FIG. 2 may be implemented together, separately, or in different combinations to provide the behavior described here.

Returning to FIG. 1, the displayed report 104 is a monthly sales report presented as a bar chart. Report 104 includes y-axis labels, though inclusion or not of x- or y-axis labels in a report is a determination left to the implementer. A region 102 of display 108 adjacent to report 104 indicates the available categories and particular category values used to generate the report. In the illustrated case, the categories are "Region," "Country," "State/Department," and "Product," and the values used to generate report 104 are, respectively, "North America," "United States of America," "Louisiana," and "Roambi". A list 110 to the left of chart 104 lists each of the values associated with the "State/Department" category, with "Louisiana" highlighted to indicate it is the selected value used to generate the report. Similarly, a list 112 to the right of chart 104 lists each of the values from the "Region" category, with "North America" highlighted to indicate it is the selected value used to generate the report.

A magnitude chart 114 is located above chart 104 and is associated with the "Product" category. The magnitude chart 114 includes a plurality of columns arranged as a bar chart. The height of each bar in the chart 114 indicates the relative magnitude of the y-coordinate value of the chart 104 with respect to the selected category value. In this case, magnitude chart 114 is associated with the "Product" category, and the displayed chart 104 is for the Roambi product. Thus, the highlighted bar in magnitude chart 114 indicates the relative magnitude of Roambi sales compared to other products. Similarly, magnitude chart 116 is associated with the "Country" category, and the highlighted bar indicates the relative magnitude of the displayed "Country" value ("United States of America") in chart 104.

As noted, a user provides input to device 100 by performing a touch gesture or other input function. For purposes of clarity only, we assume for the remainder of this description that the method of user input is a touch gesture on display 108, though other methods described above are also suitable.

Figure 3:
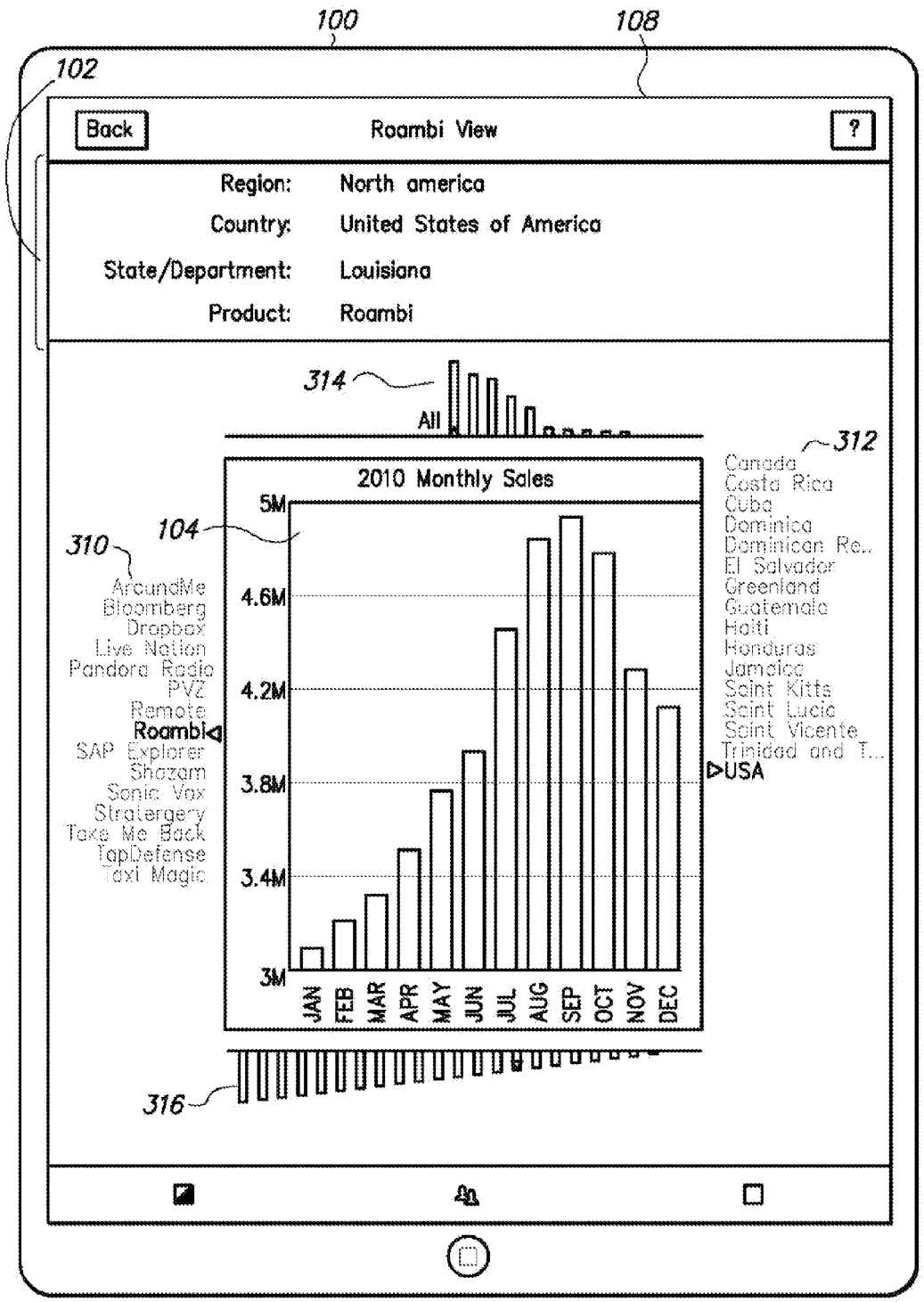
FIG. 3 illustrates a second view of a multi-category chart in accordance with one embodiment.

In various embodiments, the user swipes across display 108 to change the displayed category values in lists 110 and 112. In one embodiment, the user swipe is a multi-touch rotation gesture. In other embodiments, other gestures may be used. In response to the user input, the category values displayed in lists 110 and 112 are removed, and category values associated with the other categories are displayed instead. Referring to FIG. 3, list 310 now displays a list of category values associated with the "Product" category, and list 312 now displays a list of values associated with the "Country" category. "Roambi" and "USA" are highlighted, respectively, in each of the two lists to indicate that they are the value selected to create the displayed chart 104.

In FIG. 3, magnitude chart 316 indicates the relative magnitude of the "Louisiana" value of the "State/Department" category compared to other values in that category. Magnitude chart 314 indicates the relative magnitude of "North America" compared to other values in the "Region" category.

As noted, the displayed category values are alternated in response to user gesture input. In one embodiment, an animation is displayed illustrating the rotation of the textual labels 110, 112 and their conversion into magnitude charts 314, 316; and illustrating the rotation of magnitude charts 114, 116 into category textual labels 310, 312. In one embodiment, a second gesture input causes a similar rotation in the other direction.

In one embodiment, selection by a user, e.g., by touch or other input, of one of the category values in category list 110, 112, 310, 312 or one of the magnitude bars in magnitude chart 114, 116, 314, 316 causes the displayed chart 104 to be replaced by the chart corresponding to the selected category value. For example, referring again to FIG. 1, selection by the user of "Kentucky" would cause displayed chart 104 to be replaced by a chart showing 2010 Monthly Sales of the Roambi product in Kentucky.

Figure 4:
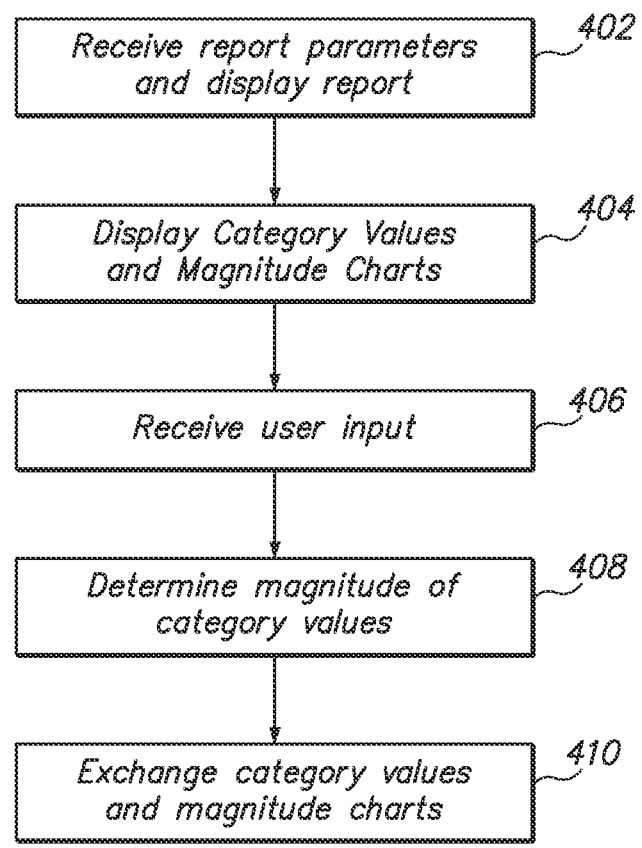
FIG. 4 is a flowchart for displaying multi-category charts in accordance with one embodiment.

FIG. 4 is a flowchart illustrating a method for displaying graphical report data in accordance with one embodiment. Report engine 230 receives 402 report data from database 205. The report data includes configuration parameters that include a list of categories and their values, and an indication of the particular category values used for the report to be displayed. Report data also includes, for each of the category values, relative magnitude of the average y-coordinate value for a chart based on that category value.

The report is then displayed on display 108. In addition, category values for a first two categories are displayed 404 adjacent to the chart, and magnitude charts indicating the relative magnitude of each value of a third and fourth category are displayed 404 adjacent to the chart. The category values used to generate the displayed chart are highlighted in the category value lists and the bars in the magnitude bar charts associated with the category values from the third and the fourth categories used to generate the chart are also highlighted.

When a user provides user input such as a gesture, report engine 230 receives 406 information describing the input from IO driver 220. This may, for example, be a start coordinate and finish coordinate of the gesture, or an indication of a multi-touch rotation gesture. Report engine 230 then determines 408 the magnitude values for the first and second categories, either by calculating them or by having received them at step 402, and replaces 410 the displayed category values from the first and second categories with the category values of the third and fourth categories. Similarly, the magnitude charts for the third and fourth categories are replaced 410 by magnitude charts for the first and second categories.

In addition to the embodiments specifically described above, those of skill in the art will appreciate that the invention may additionally be practiced in other embodiments.

Within this written description, the particular naming of the components, capitalization of terms, the attributes, data structures, or any other programming or structural aspect is not mandatory or significant unless otherwise noted, and the mechanisms that implement the described invention or its features may have different names, formats, or protocols. Further, the system may be implemented via a combination of hardware and software, as described, or entirely in hardware elements. Also, the particular division of functionality between the various system components described here is not mandatory; functions performed by a single module or system component may instead be performed by multiple components, and functions performed by multiple components may instead be performed by a single component. Likewise, the order in which method steps are performed is not mandatory unless otherwise noted or logically required. It should be noted that the process steps and instructions of the present invention could be embodied in software, firmware or hardware, and when embodied in software, could be downloaded to reside on and be operated from different platforms used by real time network operating systems.

Algorithmic descriptions and representations included in this description are understood to be implemented by computer programs. Furthermore, it has also proven convenient at times, to refer to these arrangements of operations as modules or code devices, without loss of generality.

Unless otherwise indicated, discussions utilizing terms such as "selecting" or "computing" or "determining" or the like refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented are not inherently related to any particular computer or other apparatus. Various general-purpose systems may also be used with programs in accordance with the teachings above, or it may prove convenient to construct more specialized apparatus to perform the required method steps. The required structure for a variety of these systems will appear from the description above. In addition, a variety of programming languages may be used to implement the teachings above.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention. Various modifications, changes and variations, which will be apparent to those skilled in the art, may be made in the arrangement, operation and details of the method and apparatus disclosed herein without departing from the spirit and scope defined in the appended claims.

We claim:

1. A computer implemented method for displaying graphical reports, the method comprising:
   displaying a chart representation of a report on a display of a device, the report including data associated with a first value of a first category type and a second value of a second category type;
   displaying a first plurality of values of the first category type adjacent to a first side of the chart representation, the first plurality of values displayed textually;
   displaying a second plurality of values of the second category type adjacent to a second side of the chart representation, the second plurality of category values displayed graphically as magnitudes; and
   responsive to a user input, changing the display to present the first plurality of values of the first category type graphically as magnitudes and present the second plurality of values of the second category type textually.

2. The computer implemented method of claim 1, wherein changing the display responsive to the user input comprises:
   presenting the second plurality of values in a textual representation adjacent to the first side of the chart representation; and
   presenting the first plurality of values in a graphical representation of magnitudes, adjacent to the second side of the chart representation.

3. The computer implemented method of claim 1, wherein the chart representation of the report comprises at least a vertical axis and a horizontal axis, wherein category values represented textually are displayed adjacent to the vertical axis and category values represented graphically are displayed adjacent to the horizontal axis.

4. The computer implemented method of claim 1, further comprising:

displaying a third plurality of values of a third category type adjacent to a third side of the chart representation, the third plurality of values represented textually; and displaying a fourth plurality of values of a fourth category type adjacent to a fourth side of the chart representation, the fourth plurality of values displayed using a graphical representation of magnitudes;

wherein changing the display responsive to the user input further comprises:

presenting the fourth plurality of values in a textual representation adjacent to the third side of the chart representation; and presenting the third plurality of values in a graphical representation of magnitudes, adjacent to the fourth side of the chart representation.

5. The computer implemented method of claim 4, wherein each plurality of values displayed textually is presented adjacent to a vertical side of the chart and each plurality of values displayed using graphical representation of magnitudes is presented adjacent to a horizontal side of the chart.

6. The computer implemented method of claim 1, further comprising:

responsive to receiving a second user input, reverting the display of the plurality of the first category values to textual representation and the plurality of second category values to graphical representation of magnitudes.

7. The computer implemented method of claim 1, wherein the user input is a first user input, the method further comprising:

responsive to receiving a second user input selecting one of the first plurality of values, changing the chart representation of the report to display data associated with the selected value of the first plurality of values.

8. The computer implemented method of claim 1, wherein the first value is distinguished from remaining values of the first plurality of values and the second value is distinguished from remaining values of the second plurality of values.

9. The computer implemented method of claim 8, wherein distinguishing a value from other values comprises one of highlighting the value or displaying a marker adjacent to the value.

10. The computer implemented method of claim 1, wherein the user input is a first user input, the method further comprising:

responsive to a second user input, selecting a third category type and a fourth category type based on the second user input:

replacing the display of the first plurality of values of the first category type by a third plurality of values of a third category type; and replacing the display of the second plurality of values of the second category type by a fourth plurality of values of a fourth category type.

11. The computer implemented method of claim 1, wherein the user input is a single-action user input comprising one of swiping across the display or a multi-touch rotation input.

12. The computer implemented method of claim 1, wherein a graphical representation of magnitudes of a plurality of values of a category type is a bar chart.

13. A system for displaying graphical reports, the system comprising:

a computer processor; and a computer-readable storage medium storing computer program modules configured to execute on the computer processor, the computer program modules comprising:

an input/output driver module configured to:

display a chart representation of a report on a display of a device, the report including data associated with a first value of a first category type and a second value of a second category type;

display a first plurality of values of the first category type adjacent to a first side of the chart representation, the first plurality of values displayed textually;

display a second plurality of values of the second category type adjacent to a second side of the chart representation, the second plurality of category values displayed graphically as magnitudes; and responsive to a user input, change the display to present the first plurality of values of the first category type graphically as magnitudes and present the second plurality of values of the second category type textually.

14. The system of claim 13, wherein changing the display responsive to the user input comprises:

presenting the second plurality of values in a textual representation adjacent to the first side of the chart representation; and presenting the first plurality of values in a graphical representation of magnitudes, adjacent to the second side of the chart representation.

15. The system of claim 13, wherein the input/output driver module is further configured to:

display a third plurality of values of a third category type adjacent to a third side of the chart representation, the third plurality of values represented textually; and display a fourth plurality of values of a fourth category type adjacent to a fourth side of the chart representation, the fourth plurality of values displayed using a graphical representation of magnitudes;

wherein changing the display responsive to the user input further comprises:

presenting the fourth plurality of values in a textual representation adjacent to the third side of the chart representation; and presenting the third plurality of values in a graphical representation of magnitudes, adjacent to the fourth side of the chart representation.

16. The system of claim 13, wherein the input/output driver module is further configured to:

responsive to receiving a second user input, revert the display of the plurality of the first category values to textual representation and the plurality of second category values to graphical representation of magnitudes.

17. A computer program product having a non-transitory computer-readable storage medium storing computer-executable code for displaying reports, the code comprising:

an input/output driver module configured to:

display a chart representation of a report on a display of a device, the report including data associated with a first value of a first category type and a second value of a second category type;

display a first plurality of values of the first category type adjacent to a first side of the chart representation, the first plurality of values displayed textually;

display a second plurality of values of the second category type adjacent to a second side of the chart representation, the second plurality of category values displayed graphically as magnitudes; and responsive to a user input, change the display to present the first plurality of values of the first category type graphically as magnitudes and present the second plurality of values of the second category type textually.

18. The computer program product of claim 17, wherein changing the display responsive to the user input comprises:
   presenting the second plurality of values in a textual representation adjacent to the first side of the chart representation; and
   presenting the first plurality of values in a graphical representation of magnitudes, adjacent to the second side of the chart representation.

19. The computer program product of claim 17, wherein the input/output driver module is further configured to:
   display a third plurality of values of a third category type adjacent to a third side of the chart representation, the third plurality of values represented textually; and
   display a fourth plurality of values of a fourth category type adjacent to a fourth side of the chart representation, the fourth plurality of values displayed using a graphical representation of magnitudes;
   wherein changing the display responsive to the user input further comprises:
      presenting the fourth plurality of values in a textual representation adjacent to the third side of the chart representation; and
      presenting the third plurality of values in a graphical representation of magnitudes, adjacent to the fourth side of the chart representation.

20. The computer program product of claim 17, wherein the input/output driver module further configured to:
   responsive to receiving a second user input, revert the display of the plurality of the first category values to textual representation and the plurality of second category values to graphical representation of magnitudes.

* * * * *